United States Patent [19]

Grawey

[11] 4,175,992

[45] Nov. 27, 1979

[54] METHOD OF MAKING HIGH PRESSURE REINFORCED HYDRAULIC HOSE

[75] Inventor: Charles E. Grawey, Peoria, Ill.

[73] Assignee: Caterpillar Tractor Co., Peoria, Ill.

[21] Appl. No.: 889,832

[22] Filed: Mar. 23, 1978

Related U.S. Application Data

[62] Division of Ser. No. 673,187, Apr. 2, 1976, abandoned.

[51] Int. Cl.$^2$ .............................................. B65H 81/00
[52] U.S. Cl. ..................................... 156/143; 138/129; 138/144; 156/149; 156/171; 156/195
[58] Field of Search ............... 156/169, 171, 172, 148, 156/149, 393, 244.13, 244.12, 161, 162, 276, 62.2, 62.6, 143, 431, 432, 195, 191; 138/125, 127, 130, 134, 144, 129, 126; 242/7.21; 264/103; 57/9, 10, 12, 13, 14

[56] References Cited

U.S. PATENT DOCUMENTS

| | | | |
|---|---|---|---|
| 2,277,397 | 3/1942 | Graham | 138/130 |
| 3,112,234 | 11/1963 | Krupp | 156/169 |
| 3,228,616 | 1/1966 | Grosh | 242/7.21 |
| 3,357,456 | 12/1967 | Grawey et al. | 138/127 |
| 3,866,633 | 2/1975 | Taylor | 138/130 |

Primary Examiner—Michael W. Ball
Attorney, Agent, or Firm—Joseph L. Strabala

[57] ABSTRACT

Hydraulic circuits having flexible hydraulic hoses forming part of the circuits are currently being operated at pressures in excess of 3,000 psi, and such circuits are often limited in their operating pressure by the burst strength of the hydraulic hose. By constructing a hollow core structure that forms the conduit and which serves as the foundation upon which the reinforcing is applied, with a two-layer tape composed of a layer of fabric and a layer of elastomer, which tape is then wound on a mandrel in a helically overlapping relationship with the fabric on the outside, an improved hose can be obtained after the reinforcing is applied. An increase in burst strength can be obtained in such a hose where wire cable is employed as the reinforcing in place of monofilament wire reinforcing, when the cable is formed (twisted) as it is applied, to achieve a more uniform tension on each of the strands forming the cable encircling the core structure.

9 Claims, 9 Drawing Figures

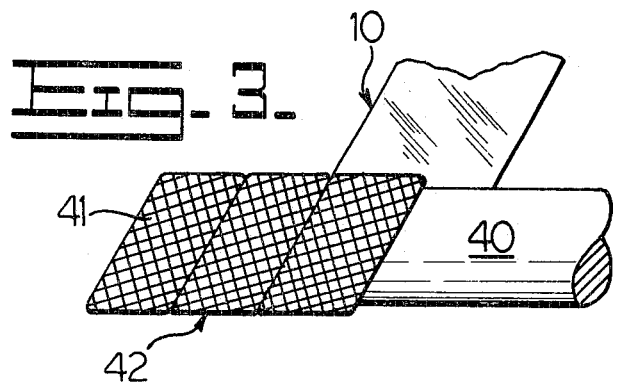
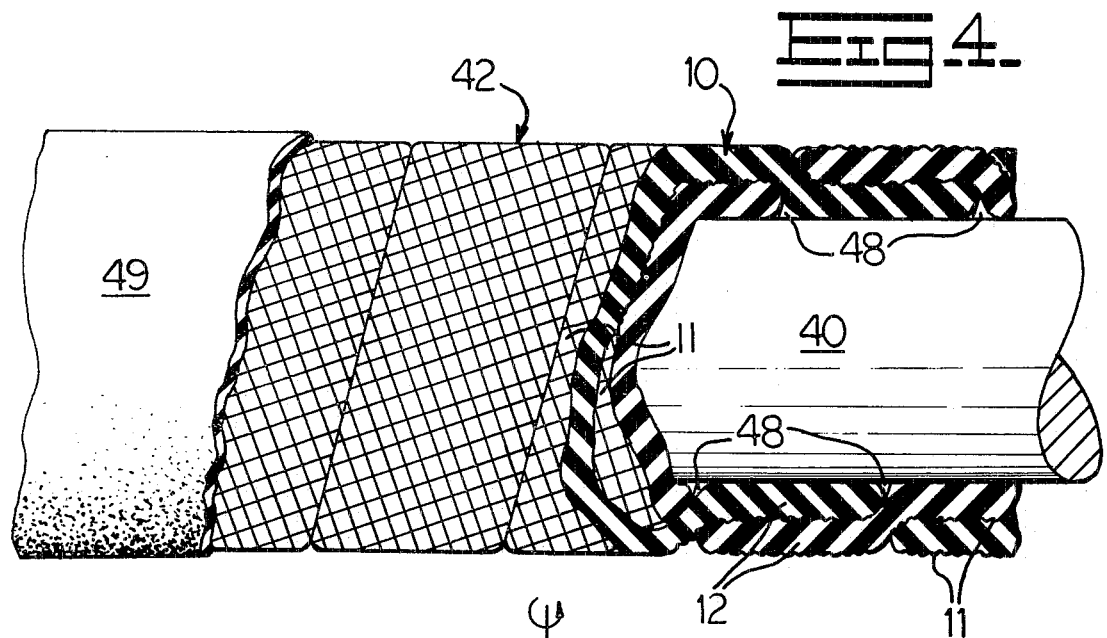
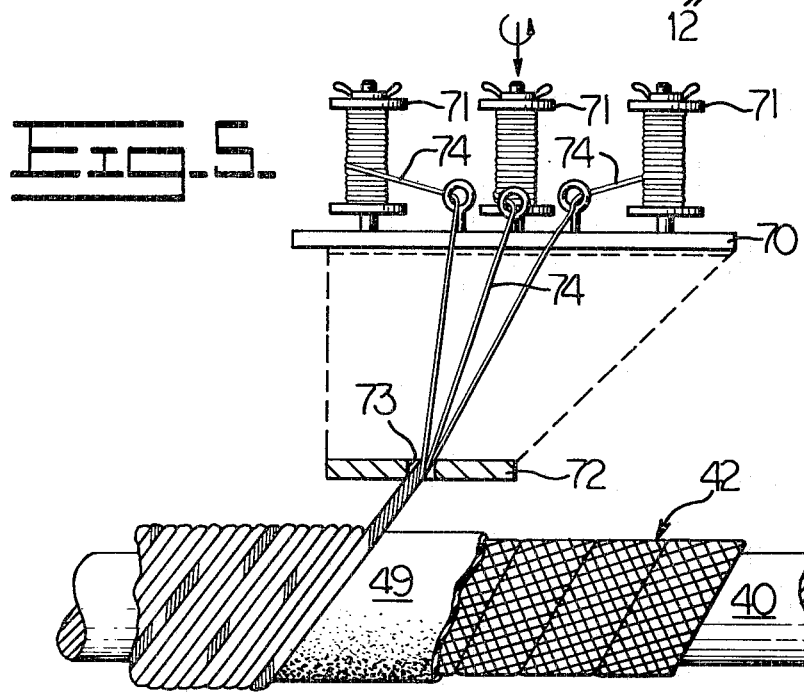

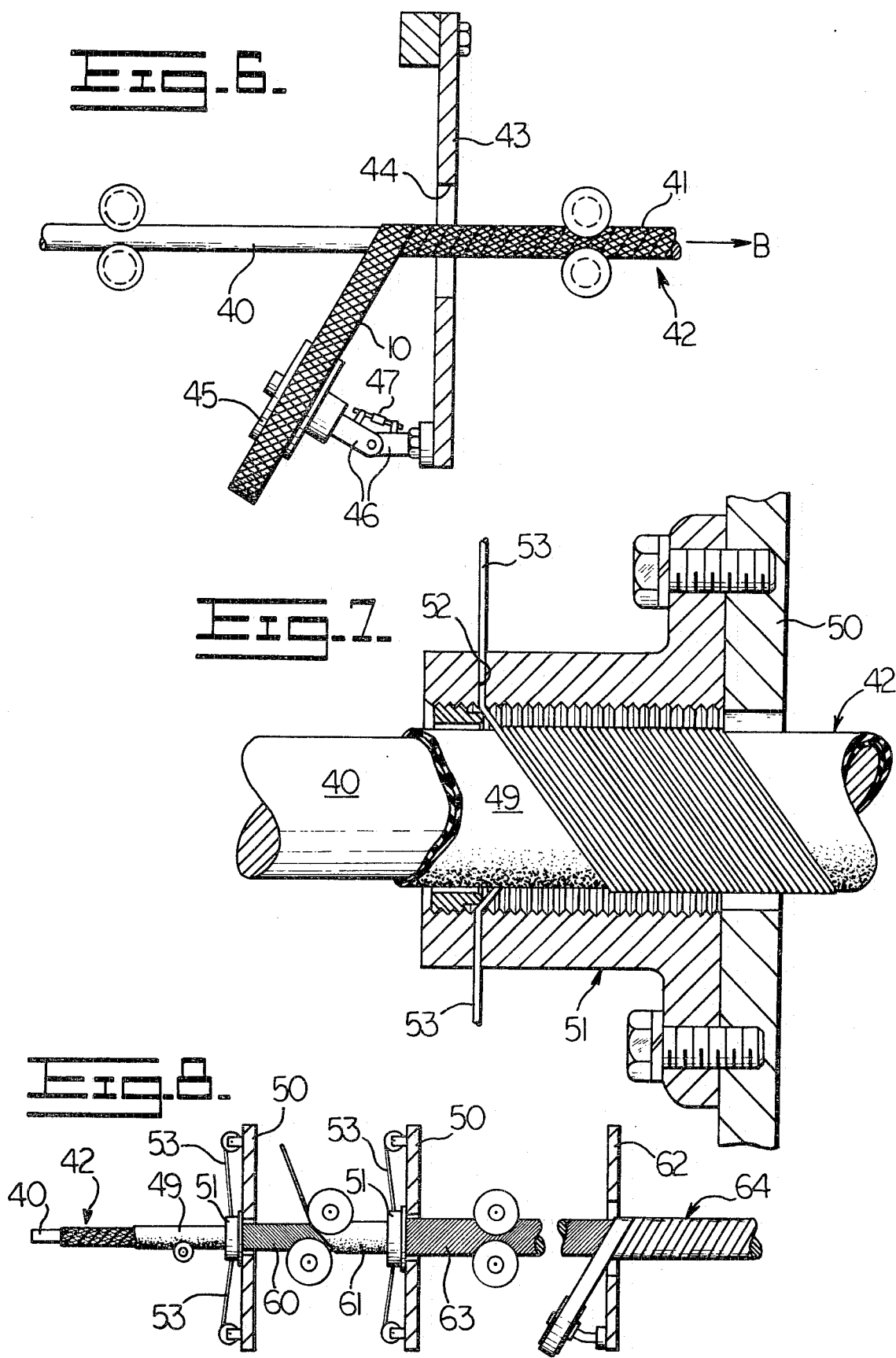

METHOD OF MAKING HIGH PRESSURE REINFORCED HYDRAULIC HOSE

This is a division of Ser. No. 673,187, filed Apr. 2, 1976, now abandoned.

BACKGROUND OF THE INVENTION

High pressure wire reinforced hydraulic hose is typically used on a variety of machines, including earth-working machines, to provide a flexible connection between several moving parts of a common hydraulic circuit employed on or with the machine. Most often, such hoses are employed in circuits and articulated machines or machines wherein one part must move relative to the other part. Typical reinforced hydraulic hose structures utilized in such applications are illustrated in U.S. Pat. No. 2,128,814 issued to Gish; U.S. Pat. No. 3,312,528 issued to Haas; U.S. Pat. No. 3,357,456 issued to Grawey et al; and U.S. Pat. No. 3,866,633 issued to Taylor.

All of the hose structures described in the aforementioned patents include a hollow elastomer core on which successive cylindrical plies of wire reinforcing are concentrically applied to contain the radial and axial pressures developed within the hose when it is placed in service at high pressures in the range of 3,000 psi or greater. To some extent, the burst strength of these hoses can be increased by adding additional reinforcing plies (within limits) and in most cases, an even number of reinforcing plies must be used so that the angular wrap of opposite hand of two adjacent plies balance one another.

One of the critical areas of construction of such hydraulic hose is the core structure. With the exception of the aforementioned Grawey et al U.S. Pat. No. 3,357,456, the core structures in such hoses have been typically extruded as a cylindrical tube to obtain a continuous circular wall for the hose and to provide the foundation upon which the wire reinforcing can be applied to complete the hose. Typically, the core is protected with a layer of fabrics as mentioned in the above patents, before the reinforcing is applied.

The above Grawey et al patent, teaches the preparation of an improved core in such wherein a laminated tape composed of at least one of elastomer and at least one layer fabric is wrapped on a mandrel, usually in a helical overlapping relationship, to form a core. This combination elastomer and fabric core generally has a greater capacity to restrict the embedding or "biting" of the reinforcing wires into the core structure, and therefore helps achieve greater concentricity of the first ply of cylindrical reinforcing wrapped on the core structure. Since each cylindrical reinforcing ply forms the base for the subsequent cylindrical reinforcing ply, an overall improvement in hose structure is thus achieved. U.S. Pat. No. 3,866,633 attempts to appropriate the teachings of the Grawey et al patent by an extruded core structure which utilizes aligned fibers in an extruded cylindrical core.

One of the objects of the present invention is the provision of a stiffer "base" on which to wrap the first ply of wire, which improves the wire lay in this ply. With improved wire lay in this ply and subsequent plies, stress distribution during hose preparation should be more uniform between the wires in each individual ply, resulting in a higher burst pressure approaching the theoretical.

Still another object of the instant invention is to provide a hydraulic hose with an improved laminated core structure wherein improved "knit lines" are achieved in a helically wrapped tape forming the core.

In addition, an object of the instant invention through the utilization of a two-layered tape, is to eliminate some of the partial cure that results in multi-layered tapes as a result of viscous shear in the rubber, which causes localized heat buildup and partial cure of the heat sensitive compounds therein.

SUMMARY OF THE INVENTION

An improved flexible wire reinforced rubber hose is fabricated on a mandrel on which a laminated tape consisting of a layer of fabric or randomly distributed short fibers in a layer and a thicker layer of elastomer is spirally wound on the mandrel, with the elastomer layer against the mandrel, in an overlapping relationship to form a core foundation having an outer fabric surface, then applying a thin layer of elastomer bond stock on the outer fabric surface and subsequently winding a first cylindrical ply of a plurality of inextensible reinforcing elements onto said resulting core foundation in a series of parallel side-by-side spiral convolutions to form a first cylindrical reinforcing ply having a wall thickness equal to the diameter of the reinforcing elements while maintaining tension on said elements when said winding is occurring to ensure the elements substantially penetrate the bond stock to the outer fabric surface of the core, and then subsequently adding a second cylindrical ply on said first cylindrical ply by winding a plurality of reinforcing elements onto said first cylindrical ply in a series of parallel side-by-side spiral convolutions to form a second cylindrical reinforcing ply having a wall thickness equal to the diameter of its reinforcing elements followed by subsequently curing the elastomers so reinforced as an integral hose unit by vulcanizing the resulting built up hose structure.

All of the elastomers are in an uncured state and normally bond stock is also placed between the two reinforcing plies to insulate them from one another, and the second reinforcing ply is of opposite hand (an angle equal but opposite the spiral wrap of the first reinforcing ply). The reinforcing elements can be composed of multi-strand wire cables that are twisted into a cable configuration as the element is wound.

BRIEF DESCRIPTION OF THE DRAWINGS

FIG. 3 is a perspective illustrating the wrapping of the two-layered tape onto a mandrel in an overlapping relationship;

FIG. 4 is a perspective illustrating the application of an elastomer bond stock layer onto the core formed by the wrapping process illustrated in FIG. 3;

FIG. 5 is a schematic illustration illustrating the application of cable reinforcing elements onto the hose core wherein the cable reinforcing elements are composed of multiple monofilament wires separately tensioned and twisted into a cable as they are being wound;

FIG. 6 is an elevation partly in section illustrating the wrapping of the two-layered tape onto a mandrel to form the core structure;

FIG. 7 illustrates a conventional winding head for wrapping a layer of monofilament reinforcing elements onto the structure formed according to this invention; and FIG. 8 illustrates, partially in section, a multiple winding deck for hose manufacturing in a schematic fashion.

DESCRIPTION OF A PREFERRED EMBODIMENT

In reference to this invention, it is believed that the Grawey U.S. Pat. No. 3,357,456 is the most similar to the instant invention; however, the instant invention represents a refinement in the manufacture of the high pressure hydraulic hose described in the referenced Grawey patent.

Figure 1:
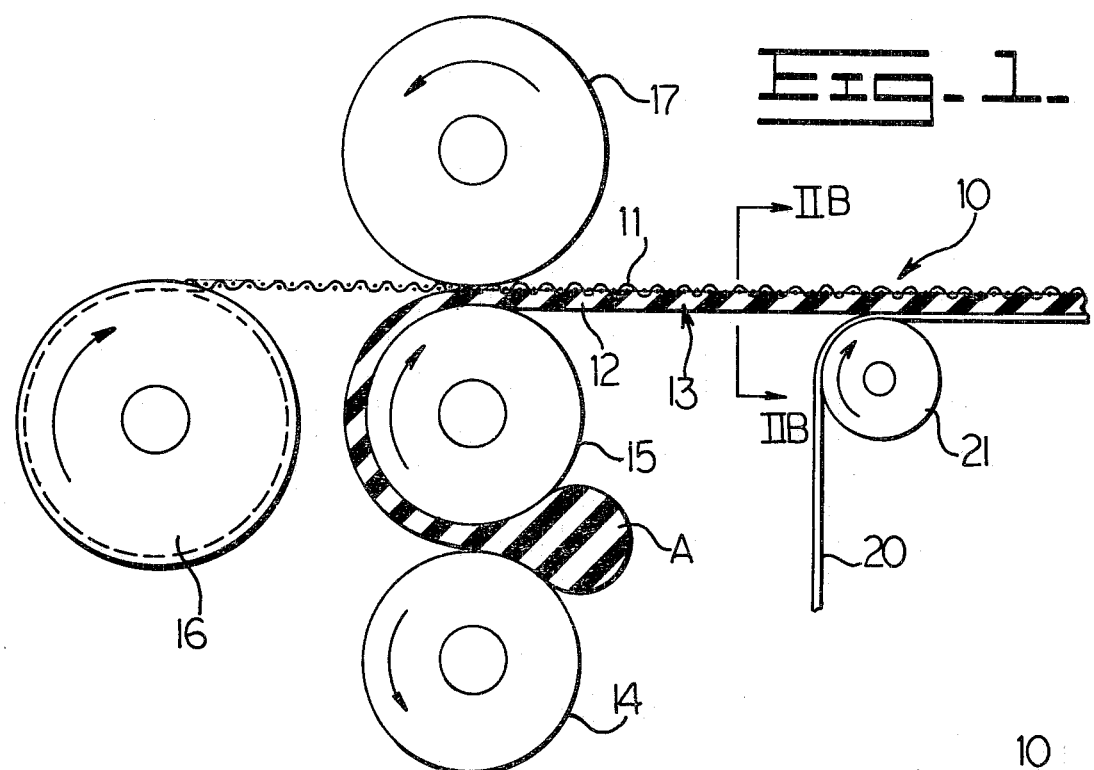
FIG. 1 is a schematic illustrating the formation of the two-layered tape, i.e., fabric and uncured elastomer, showing the calendar rolls and fabric supply reel.
Figure 2A:
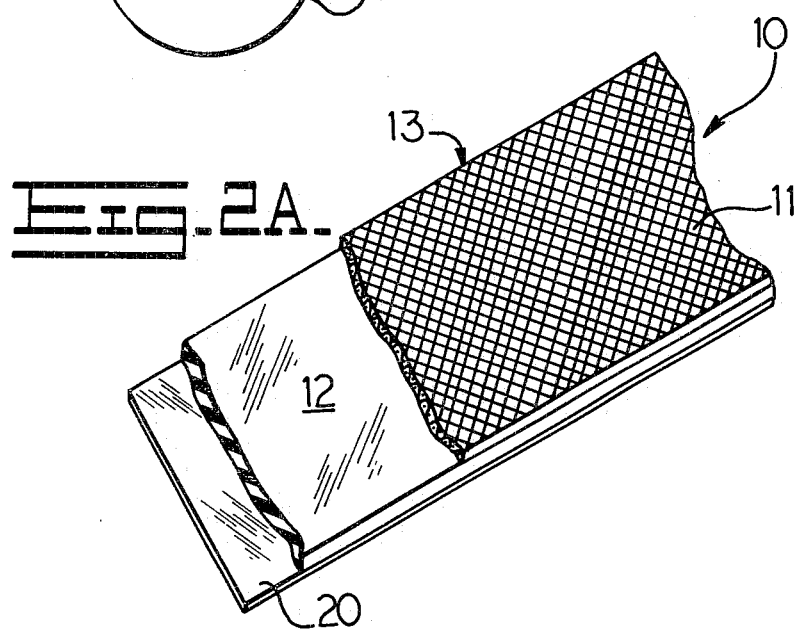
FIG. 2A is a perspective of the two-layered tape with parts broken away to show the relationship between the fabric and elastomer layers.
Figure 2B:
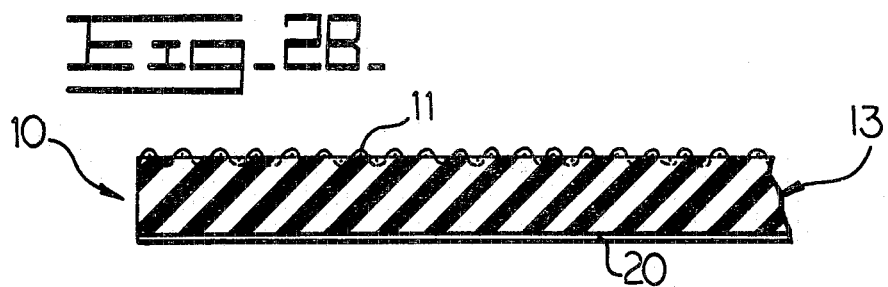
FIG. 2B is a section further detailing the structure of the two-layered tape.

By reference to FIGS. 1 and 2, the construction of the two layer laminated tape 10 can be appreciated. Basically, this tape can consist of a fabric layer 11 and an uncured elastomer layer 12 which are formed in an integral sandwich 13 through the use of calendaring rollers 14 and 15 which convert the uncured elastomer supply "A" into an elastomer layer of uniform thickness. This uniform elastomer layer is then married to the fabric layer 11 supplied from supply reel 16, through the utilization of a compression roller 17 co-acting with calendar roll 15 to squeeze the elastomer layer 12 and the fabric layer 11 together to form an integral sandwich composed of the two layers.

In general, when the elastomer fabric sandwich 13 is formed, the fabric is physically forced into the elastomer layer 12 in a manner that portions of the elastomer layer are forced partially into the open mesh of the fabric whereby at least a friction bond, if not some adhesive bond, is obtained between the several layers. Normally when this occurs, the elastomer layer is not forced through the mesh sufficiently far to coat the outer surface of the fabric. After the tape 10 is formed, if the fabric is pulled free of the elastomer layer, the latter is left with a plurality of checks or squares where the open mesh has been imbedded therein.

It is important that the elastomer layer be somewhat thicker than the fabric layer in order to achieve sufficient rubber flow when the core cured with the reinforcing is to "knit" all the seams particularly along the cylindrical surface of the mandrel, so that no leakage will occur through the core structure. In general, the mesh fabrics employed are fabricated of nylon or the like and have a mesh size sufficient for the elastomers on opposite sides of the fabric to interbond through the mesh openings when the core has been formed by winding the tape in a spiral overlapping relationship. Normally the fabric will have from 16-20 threads per inch for both the warp and the weft. The thickness of the fabric used is approximately 0.010 inches, and in general, the elastomer layer should be of a thickness from 0.015 to 0.050 inches. Particularly preferred is an elastomer layer having an approximate uniform thickness of 0.045 inches.

In the fabrication of the tape 10 illustrated in FIG. 1, the sandwich 13, after passing through the compression step between rollers 15 and 17, is covered with a polyethylene sheet 20 which is applied to the elastomer side sandwich as it egresses from the rollers from a supply (not shown) and is applied to the elastomer layer 12 by roller 21. After the polyethylene sheet has been applied, the sandwich 13 can be slit into a uniform width to form the tape 10, which is then collected (wound) on a supply reel for subsequent use. To form the tape, the layered fabric and elastomer sheet are slit against a roller with the fabric arranged to contact the surface of the roller to achieve severance of the threads of the fabric with a minimum of displacement. In addition, in the two-layered tape, the degree of cure in the elastomer, when stored for a considerable period of time, is much easier to determine than in the three-layered tape. It is also possible to make the two layer tape by sprinkling short fiber on the surface of the elastomer in a random manner to achieve the proper fabric thickness and thereafter calendaring these two layers to achieve satisfactory adhesion between the elastomer and the fibers.

Referring to FIG. 3, it can be seen how the tape 10 is wrapped onto a mandrel 40 in a helical or spiral advancing overlapping relationship. This wrapping technique whereby the elastomer layer 12 is wound against the mandrel, leaves an outside fabric surface 41 on the exterior of the core 42 and, of course, the polyethylene sheet is stripped from the tape before it is wrapped in the described manner.

While FIG. 3 illustrates the formation of the core structure 42 according to this invention, it is normally formed in a automated process (see FIG. 6) using a tape winding deck 43 having a central aperture 44 through which the mandrel 40 is advanced while the deck is rotating. A tape reel 45 is attached to the winding deck to revolve about the mandrel and is supported by an adjustable linkage 46 through turn buckle 47; this can adjust the angle of the tape reel so that the tape 10 can be applied in a uniform overlapping relationship as mandrel 40 advances in the direction of arrow B.

The resulting structure obtained is best illustrated in FIG. 4 wherein the lap relationship of the tape 10 is best illustrated when it has been wrapped in the mandrel 40 to form the core 42. In general, at least two layers of fabric are present in the core structure in a lapping relationship since the tape is preferably wrapped with a one-half overlap as it is advanced spirally or helically along the mandrel 40. As can be seen in this figure, the elastomer is contiguous to the surface of the mandrel and as a result, the thicker elastomer layer can flow into the spiral seams 48 along the surface of the mandrel when the resulting built-up hose structure is cured or vulcanized. Also shown in FIG. 4 is the layer of elastomer bond stock 49 which is usually applied to the fabric surface of the hose core before the first ply of reinforcing is wound thereon. This bond stock is specifically selected to give better bonding characteristics to the reinforcing wires or cables which are often brass-plated to insure better bonding with the elastomer bond stock. Alternatively it can be sprayed on the surface of the core in a liquid state. The bond stock itself can be applied by wrapping the core or can be placed on the core by forming a sheet positioned along the surface of the core after it has been formed so that a longitudinal seam is formed, that can be formed with a lap if desired.

To have quality high pressure hydraulic hose, it is necessary for the spiral seam in the spirally wrapped core to "knit" in the area of spiral seams against the mandrel 40 so that a smooth continuous hose wall without pinholes is obtained. The thicker elastomer layer accomplishes this when the cure or vulcanization takes place, since it can flow into this spiral groove 48 and "knit" the wall to provide a smooth continuous holefree liner, without any increase in the overall thickness of the laminated tape.

Further, the core structure so obtained has a fabric surface which is properly located to better resist the biting or penetration of the reinforcing which will be subsequently applied to the hose core.

More specifically, the bond stock layer 49 is relatively soft and thus, as the reinforcing wires are wound in a spiral side-by-side convolution onto the bond stock, they will substantially penetrate the bond stock almost to the fabric surface of the core as the reinforcing elements are wound. Also these elements are tensioned so that a uniform concentric reinforcing ply can be obtained. In reference to winding the reinforcing ply, reference is made to FIG. 7 wherein the hub of a winding deck 50 is equipped with a head 51 that has a plurality of radial holes 52 through which monofilament reinforcing elements can be threaded so that as the winding deck 50 rotates about mandrel 40, the plurality of wires will be applied in a side-by-side series of convolutions on the surface of the bond stock. Each of the reels from which the wire is fed are tensioned to insure that all the reinforcing elements shown in FIG. 7 as monofilament wires 53 each have a separate and predetermined tension. This again insures greater concentricity in the first ply of the reinforcing when it is applied onto the built-up core structure 42.

As can be seen in FIG. 8, the several reinforcing plys are applied simultaneously as the mandrel 40 is advanced through a plurality of conventional winding decks 50. The core formed on the mandrel equipped with the bond stock 49 is advanced through the first winding deck wherein the first concentric ply 60 of reinforcing is wound onto the bond stock with the supply reels for the reinforcing elements 53 separately tensioned, (tensioning devices not shown). After the first reinforcing ply has been wound onto the core structure and the layer of bond stock 61 is formed thereover and the build-up structure passes through the second winding deck which is identical to the first, but rotates in the opposite direction. As a result, the second ply will be angularly disposed relative to the first ply. If only two plys are to be employed the build-up structure then passes to a casing deck 62 which winds an elastomer tape on the surface of the last reinforcing ply 63 formed by the second deck. The built-up hose structure 64 can then be covered with shrink tape and subsequently cured as a unit, with the shrink tape and the mandrel being removed subsequent to this operation.

One of the features of the instant invention is illustrated in FIG. 5 and this is the application of cable to hose structures rather than the utilization of monofilament wires which are more conventionally used.

Since cables are normally fashioned through a linear system of dies and twisted into a cable, if the cable is thereafter wound about a small radius, the cable strands will not be properly arranged (twisted) to assume as equal portion of the outward radial load. Thus, in some cases when the cable is wrapped about a small radius, the load distribution is completely unsatisfactory and the theoretical burst strength which should be obtained with the cable reinforcing is not achieved. In general, in reference to FIG. 5, a special winding technique is illustrated schematically wherein a cable winding deck 70 is employed having a plurality of separately tensioned monofilament supply reels 71. These monofilament strands are supplied from deck 70 through a guiding die 72, located adjacent to the surface of the core structure which has an aperture 73 through which these wires pass. In general, the winding deck and die revolve about the outer surface of the hose structure and because the winding deck 70 rotates about its central apertures through which the individual cable strands 74 pass they are wound into a twisted formation as the spiral convolutions are wrapped. Since each of the wire supply spools are separately tensioned, the individual strands in the resulting cable applied to the circular surface of the hose structure have substantially the same tension even though they are wrapped about a relatively small radius and thus the load carrying capacity of the resulting cable approaches its theoretical value. It is important to recognize the twist of the filaments forming the cable can occur prior to the application thereof to the hose so long as the filaments are sufficiently tensioned so they move to the proper load carrying relationship in the spiral winding as it is formed. Thus, there is a slight relative axial movement of the filaments during the winding of the reinforcing. In addition, the twisting can occur within an elastomer extrusion head so that the individual filaments are coated with an uncured elastomer. While this arrangement is illustrated schematically, by reference to FIGS. 7 and 8 the technique of applying cable can be readily understood according to the above description.

In general, the wire reinforcing elements used to manufacture the reinforced hose are relatively stiff brass-plated high strength wire having diameters in the range of 0.005 to 0.030 inches. Where the cable reinforcing is used, the cable is merely made up of wires of this kind which are twisted into the cable structure.

More generally, when the reinforcing plys are wound, the winding head or die 51 trains a plurality of stiff resilient reinforcing elements onto the surface of the core so that they are wrapped in a parallel side-by-side relationship, the angle of which is determined by the rotational speed of the deck and the axial advance speed of the mandrel through the aperture and the winding deck. In general, it is desired that the angle of wrap with reference to the longitudinal axis of the mandrel be maintained in the neighborhood of 54° 44′ which is the mathematical, theoretical desirable angle for the wire reinforcing employing two such plys.

Normally to achieve high quality hose the speed of the winding deck and the speed of axial advance are closely controlled to achieve an angle of approximately 54° 44′ relative to the hose axis. Further, by the use of a soft bond stock and the fabric surface on the core structure formed according to this invention, the diameter of the cylindrical winding surface can be more closely maintained thereby allowing greater precision in the control of the angle of the reinforcing which is applied to the core structure and also is subsequent plys.

In general, when a core structure such as the kind described herein is employed and the theoretical angle is closely approximated when the reinforcing elements are applied, the resulting hose structure has less of a problem with "snaking" i.e. hose movement occurring when pressure changes occur within the hose. The latter occurs when high pressure hydraulic hose is pressurized since the variations in the reinforcing plys move to neutralize the forces in the hose and as this occurs, movement is introduced into the hose. Such movement of the reinforcing plys at higher pressures are undesirable since it can result a shearing action which can cause pinholing in the hose structure leading to leakage.

What is claimed is:

1. A method of forming cable reinforced hose comprising:

forming a hollow elastomer core on a mandrel;

winding a plurality of cable reinforcing elements on said elastomer core in side-by-side spiral convolutions to form a first cylindrical reinforcing ply, each of said cable elements being composed of multiple strands of wire, each strand being separately tensioned as it is twisted with other strands and wound on the core structure, thereby forming a cable in situ;

winding a plurality of cable elements on said first cylindrical reinforcing ply in side-by-side spiral convolutions to form a second cylindrical reinforcing ply, said spiral convolutions of said second reinforcing ply angularly crossing those of said first reinforcing ply, each of said cable elements in said second reinforcing ply being composed of multiple strands of wire, each strand being separately tensioned as it is twisted with other strands and wound, thereby forming a cable in situ;

encircling the built-up cable reinforced hose structure with jacket elastomer to form its outer covering; and subsequently vulcanizing said core, said reinforcing elements and said jacket elastomer into an integral unit to form cable reinforced hose.

2. The method as defined in claim 1 wherein the cable reinforcing elements are wound at an angle of approximately 54° 44′ in reference to the hose axis in both the first and second cylindrical reinforcing plies.

3. The method defined in claim 1 wherein the core is formed by the step of winding a laminated tape composed of layers of fabric and elastomer in a spiral overlapping relationship on the mandrel.

4. A method of making very high pressure wire reinforced hose comprising the steps of:

forming a laminate having a fabric layer from 0.006 inches to 0.020 inches and an elastomer layer from 0.015 inches to 0.050 inches with a fabric surface and an elastomer surface, said layers calendared together to form a resulting laminate;

wrapping said resulting laminate on a mandrel with the elastomer surface thereagainst in an overlapping relationship to form a hollow cylindrical core with an outer fabric surface, said overlapping relationship being at least sufficient to form at least two concentric layers of fabric in the wall of said core;

covering the outer fabric surface of the resulting core with a layer of bonding elastomer having compatible bonding characteristics with wire reinforcement;

winding under tension on said bonding elastomer a plurality of inextensible reinforcing elements in side-by-side spiral convolutions to form a first cylindrical reinforcing ply having a ply thickness equal to the diameter of said reinforcing elements;

winding under tension on said first cylindrical reinforcing ply a plurality of inextensible reinforcing elements in side-by-side spiral convolutions which angularly cross said spiral convolutions of said first ply to form a second cylindrical reinforcing ply;

encircling the resulting reinforced core structure with elastomer to form an outer jacket of said hose; and vulcanizing the elastomers and reinforcing elements and core as an integral unit;

said reinforcing elements of said first and second cylindrical plies are cables, each cable composed of multiple strands of wire, each of said strands of wire being separately tensioned when twisted with other strands and wound on the core structure so a cable reinforcing element is formed in situ during the winding process, thereby being operable to cause the individual strands in each cable element to be disposed in its reinforcing ply in a position to best oppose outward radial loadings on the hose structure.

5. The method as defined in claim 4 which includes the step of wrapping the hose with shrink tape prior to the vulcanizing step whereby the elastomers are densified during said latter step.

6. The method defined in claim 4 wherein the process includes the additional step of adding bonding elastomer on the first cylindrical reinforcing ply before the second cylindrical reinforcing ply is formed thereon.

7. The processes defined in claim 4 wherein the reinforcing elements are wound in their respective plies at an angle of approximately 54° 44′ relative to the longitudinal axis of the hose.

8. The method as defined in claim 4 wherein the strands are monofilament steel wires having a diameter from 0.005 inches to 0.030 inches.

9. The method as defined in claim 4 wherein the fabric layer is fabricated by calendaring short randomly oriented fibers onto the surface of the elastomer layer.

* * * * *